Patented Jan. 30, 1945

2,368,280

UNITED STATES PATENT OFFICE 2,368,280

COATED WELD RODS

Evan Frank Wilson, Akron, and James L. Oberg, Barberton, Ohio, assignors to The Babcock & Wilcox Company, Jersey City, N. J., a corporation of New Jersey No Drawing. Application June 27, 1942, Serial No. 448,872

11 Claims. (Cl. 219—8)

Our invention relates to the art of welding and it is more particularly concerned with gas welding involving ferrous weld rods of intermediate chromium content.

One of the objects of the invention is to provide weld rods with a coating which will particularly facilitate the production of high quality welds by effect of the coating upon the welding operations.

Chromium bearing weld rods especially those containing less than 14% chromium are, on weld fusion, subject to oxidation with the formation of refractory chromous or ferro-chromous oxides which are retained as inclusions in the solidified weld metal. These inclusions have been the sources of cracks, in conjunction with shrinkage and solidification stresses. They have decreased the strength and ductility of welds by their interruption of the metal section and effective reduction of the load carrying area. Steels of low chromium content such as less than one percent do not form as high a proportion of chromium oxides, while steels of high chromium content such as those over 14 percent chromium are more resistant to progressive oxidation. Steels of intermediate chromium contents have presented greater welding difficulties, in the above respects. Chromium oxides, or iron oxides with an appreciable chromous oxide content have a low solubility in liquid steel; they have high melting points; and, they are substantially non-reducible by carbon or its compounds at gas welding temperatures. All of these features make such oxides particularly objectionable in welding processes.

It is an object of this invention to ameliorate such welding conditions by providing gas welding rods with coatings which are chemically basic with respect to the chromium oxides and which will offer a high degree of protection against atmospheric oxidation particularly where puddling is required. The invention involves weld rod coatings including an active agent such as sodium borate, and a relatively small proportion of calcium fluoride to act as a fluidifying agent. The prevailing chemical characteristic of the sodium borate is alkaline, and it results in a definite flux action with the chromium oxides. The addition of calcium fluoride provides a fluidifying effect compensating for the wide differential between the fusion points of sodium borate and the iron-chromium oxides.

The illustrative weld rod coating, combining sodium borate and calcium fluoride acts to clean the metal of oxides, the fluoride reducing the fusion point of the oxide and aiding in its removal from the liquid weld metal.

The illustrative weld rod coating is made adherent, and caused to have a satisfactory degree of ductility by the combination of the sodium borate and the calcium fluoride, with shellac. This material protects the sodium borate from deliquescence and washing off of the salts even when exposed to weather. Furthermore, in welding, the decomposition products resulting from the heating of the shellac carry away any moisture before it can be introduced into the fusion zone of the welding.

By way of example, but not of limitation, the illustrative coating material may have a considerable range of proportions, dependent upon several conditions of which the constituency of the metal to be welded, the diameter of the weld-rod, and the width of the weld, are major factors. The sodium borate range may be at least as great as from 20–75%, and the calcium fluoride range may be at least as great as 2½–20%, while the percentage range for the binder may be at least as great as 25–75%. One essential factor, relative to the constituency of the coating components, is that the quantity or proportion of sodium borate, or its equivalent fluxing agent, be much greater than the quantity of calcium fluoride. Coatings, in which the proportion of sodium borate to calcium fluoride is as high as .9 to 1, have been found to be effective, and coatings of higher similar proportions may be effective under certain conditions. A preferable composition is, however, as follows:

| | Percent by weight |
|---|---|
| Shellac (water thin) | 50 |
| Sodium borate | 45 |
| Calcium fluoride | 5 |

Variation in the consistency of the shellac will determine the thickness of the coating, and this in turn should depend upon the weld rod diameter and the composition, particularly the chromium content of the rod.

The fluoride proportion controls the fluidity of the molten weld metal and should be regulated to give a molten metal of the most effective fluidity for the specific type of weld construction involved.

Both of the illustrative chemical salts should be finely pulverized so as to not settle in the shellac, and the consistency of the latter should be regulated to assist in the prevention of such settling. The shellac acts not only as a binder to hold the material on the welding rod, but it also has the protective effects of preventing oxidation of the rod metal and preventing moisture absorption by the borate flux ingredient.

In the use of the illustrative weld rod for gas welding, the shellac decomposes to form protective gases which prevent direct atmospheric oxidation, and the carbon from the shellac has a reducing effect in the presence of halogen gases. This may be indicated in the following chemical reaction:

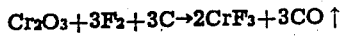

Although the flotation of undissolved oxide and its reaction with refractory chromous oxides to provide a slag of high fluidity are important results of the fluoride in the coating composition, mechanical flotation is not the primary function of the coating. In our coating, the fluoride has special effectiveness in connection with the sodium borate and a carbonaceous material. In the welding, the reducing action of the carbon is improved by reason of the presence of the fluoride. Furthermore, a spreading action to utilize the effectiveness of the fluoride, results from the presence of sodium borate.

The sodium borate is an effective flux for chromium bearing steels and its dissociated oxide ($Na_2O$) is of basic character. By reason of this character, it effectively reacts with the acid-like chromous oxide (anhydride of chromous acid). Sodium oxide, $Na_2O$ is strongly basic and the boric oxide, $B_2O_3$, which is an anhydride of pyroboric acid ($B_4O_5(OH)_2$), is a very weak acid and nearly amphoteric. For this reason the overall reactiveness of the sodium borate is basic. The thermal dissociation expressing the simple oxide relationship to the stable salt is:

In the above equation the water of association ($5H_2O$) is omitted for the sake of simplicity.

What is claimed is:

1. A flux coated metallic weld rod for gas welding comprising a core of chromium bearing steel and a coating therefor; said coating including as an active fluxing agent a substantial proportion of sodium borate (20–70%), and much smaller proportions of calcium fluoride (2–20%) as a metallic oxide fluidifying agent, and a binder having the protective and ductility properties of shellac, said binder acting as a vehicle or carrier for the fluxing and fluidifying agents.

2. A flux coated metallic weld rod, the coating having the following ranges of composition:

| | Per cent |
|---|---|
| Sodium borate | 30–70 |
| Calcium fluoride | 2–20 |
| Shellac | 30–70 |

3. A flux coated weld rod for gas welding, said weld rod comprising a core of chromium bearing steel and a coating including 20–70% sodium borate serving as an active fluxing agent having a prevailing alkaline characteristic in its reaction with iron-chromium oxides, and an oxide fluidifying agent in proportions less than half of those of the borate.

4. A flux coated weld rod for gas welding comprising a rod containing a substantial amount of chromium and a coating associated therewith including sodium borate in amounts ranging from 30–70% by weight, and calcium fluoride in amount ranging from 3% to 15% by weight.

5. A metal weld rod for gas welding chromium bearing steels, and a flux coating associated therewith; said coating including as a principal ingredient sodium borate as an active fluxing agent having a prevailing alkaline characteristic in its fluxing action, a much smaller proportion of calcium fluoride, and a protecting and adhesive binder which is ductile when hardened, the binder serving as a vehicle for sodium borate and calcium fluoride.

6. A flux coated weld rod including a metallic core of intermediate chromium content and a coating of proportions in the following range:

| | Per cent |
|---|---|
| Shellac (water thin) | 25 to 75 |
| Sodium borate ($Na_2B_4O_7.5H_2O$) | 25 to 75 |
| Calcium fluoride ($CaF_2$) | 2½ to 20 |

7. A chromium bearing weld rod with more than 1% and less than 18% chromium, and a flux coating associated therewith, said coating including sodium borate as an active fluxing salt with a prevailing alkaline characteristic in its positive fluxing action with chromium-iron oxides, and a smaller proportion of a fluidifying agent active to reduce the fusion point of chromium oxides.

8. In a coating for weldrods for gas welding chromium bearing steels, sodium borate serving as an active fluxing agent having a prevailing alkaline characteristic in its definite fluxing action with chromium oxides, an oxide fluidifying agent with a fusion point intermediate the fusion point of iron chromium oxide and the fusion point of said fluxing agent, the oxide fluidifying agent being present in a quantity much less than that of the fluxing agent and a binder which has ductility when hardened.

9. In a weldrod coating for gas welding chromium bearing steels, the coating having sodium borate as an active fluxing agent of prevailingly basic reaction with iron-chromium oxides, a much smaller proportion of an oxide fluidifying metallic salt having a fusion point lower than the fusion points of iron-chromium oxides, and a resinous binder which is ductile after hardening, the binder serving as a vehicle for the sodium borate and the oxide fluidifying salt and being present in a quantity much greater than that of the latter.

10. In a coating for weldrods for gas welding chromium bearing steels, sodium borate serving as an active fluxing agent having a prevailing alkaline characteristic in its definite fluxing action with chromium oxides, an oxide fluidifying agent with a fusion point intermediate the fusion point of iron chromium oxide and the fusion point of said fluxing agent, the fluidifying agent being effective to lower the fusion point of alloy steel oxides, and a binder which has ductility when hardened, the fluxing agent and the binder together constituting a predominant part of the coating and the fluidifying agent being present in a proportion much smaller than the proportion of the fluxing agent.

11. In a weldrod; a metallic core containing chromium; and a coating therefor; said coating containing sodium borate in sufficient quantity to provide an effective flux for the chromium bearing metal of the core, and a much smaller quantity of calcium fluoride presenting an oxide fluidifying agent in sufficient quantity to react with the refractory chromous oxides to provide a slag of high fluidity and to control the fluidity of the weld metal.

EVAN FRANK WILSON.
JAMES L. OBERG.